US012732087B2

United States Patent
Chen et al.

(10) Patent No.: US 12,732,087 B2
(45) Date of Patent: Sep. 8, 2026

(54) SWITCHING CONVERTER AND CONTROL CIRCUIT AND DISCONTINUOUS CONDUCTION MODE CONTROL METHOD THEREOF

(71) Applicant: Richtek Technology Corporation, Zhubei City (TW)

(72) Inventors: Chun-Lien Chen, New Taipei (TW); Yung-Jen Chen, Kaohsiung (TW); Chong-Rong Lee, Hsinchu (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 335 days.

(21) Appl. No.: 18/494,888

(22) Filed: Oct. 26, 2023

(65) Prior Publication Data

US 2024/0388193 A1 Nov. 21, 2024

(30) Foreign Application Priority Data

May 16, 2023 (TW) ................................ 112118193

(51) Int. Cl.
*H02M 3/158* (2006.01)
*H02M 1/00* (2006.01)
*H02M 3/156* (2006.01)

(52) U.S. Cl.
CPC ....... *H02M 1/0032* (2021.05); *H02M 1/0025* (2021.05); *H02M 3/1566* (2021.05); *H02M 3/158* (2013.01); *H02M 1/0003* (2021.05)

(58) Field of Classification Search
CPC ............ H02M 1/0032; H02M 1/0003; H02M 1/0025; H02M 3/1566; H02M 3/158; H02M 1/0035
See application file for complete search history.

(56) References Cited

U.S. PATENT DOCUMENTS

| | | | | |
|---|---|---|---|---|
| 9,124,177 | B2 * | 9/2015 | Zhu .................... | H02M 3/1588 |
| 9,590,518 | B2 | 3/2017 | Yan et al. | |
| 10,756,627 | B2 * | 8/2020 | Hsu ...................... | H02M 3/158 |

* cited by examiner

*Primary Examiner* — Alex Torres-Rivera
(74) *Attorney, Agent, or Firm* — WPAT, P.C.; Anthony King

(57) ABSTRACT

A switching converter includes: a power stage circuit configured to switch at least one switch of the power stage circuit according to a control signal, to convert an input voltage to an output voltage; and a control circuit configured to execute modulation on a pulse width according to a feedback voltage related to the output voltage, to generate the control signal in a heavy load status. In a light load status, and when the switching converter operates in a discontinuous conduction mode (DCM), after an inductor current flowing through the power stage circuit has already become a zero current, the control circuit ceases executing modulation on the pulse width according to the feedback voltage and keeps a compensation voltage correlate with the output voltage at a present level.

29 Claims, 11 Drawing Sheets

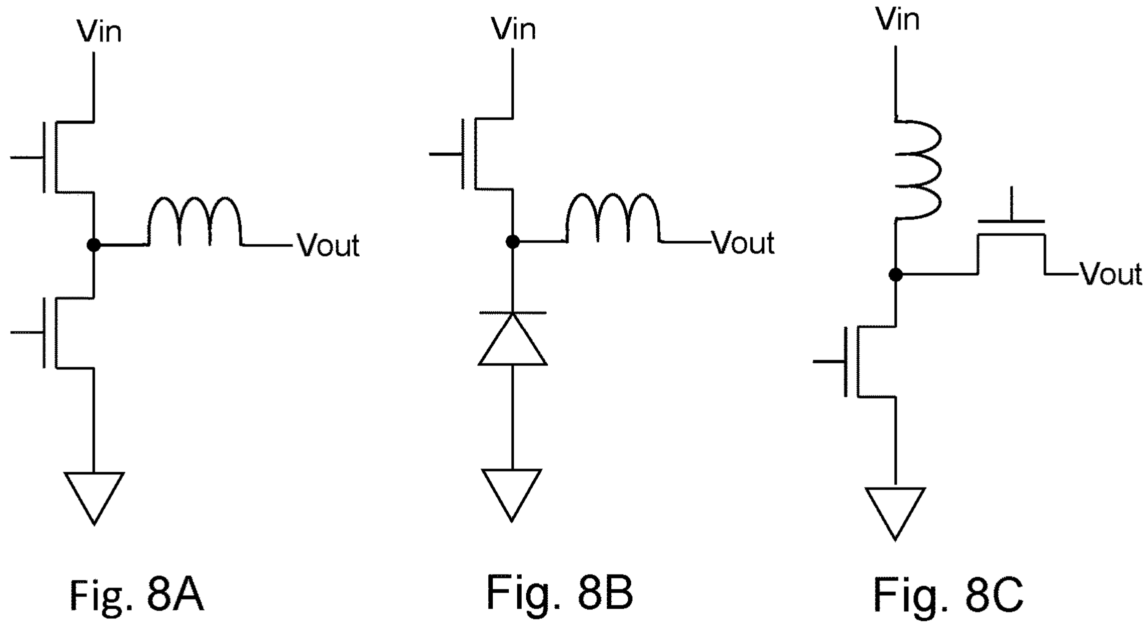
Fig. 8A
Fig. 8B
Fig. 8C
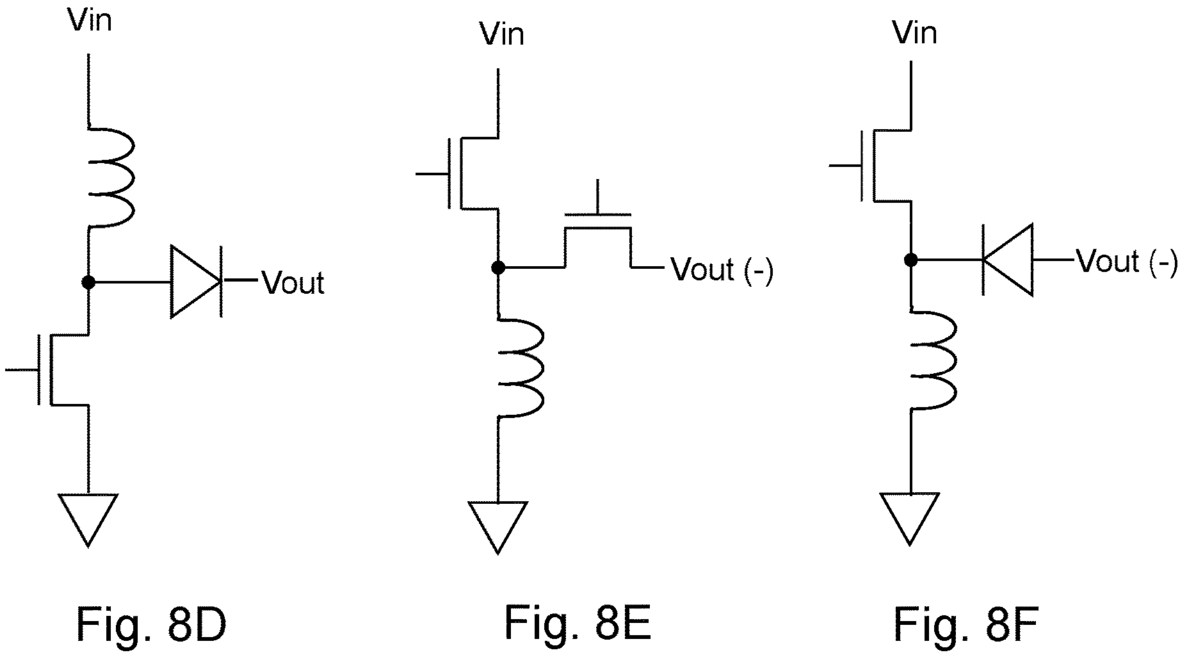
Fig. 8D
Fig. 8E
Fig. 8F

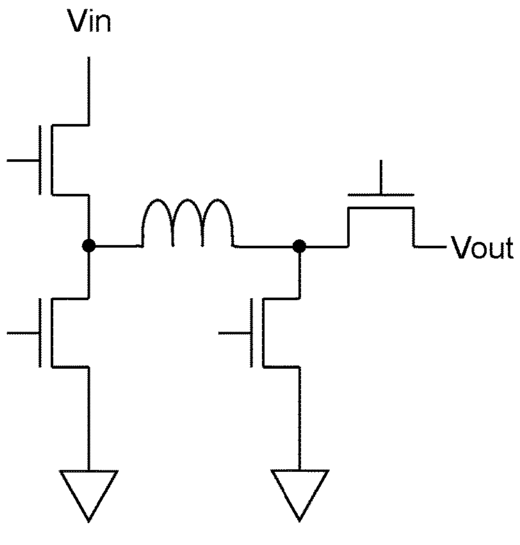
Fig. 8G
Vin
Vout
Fig. 8H
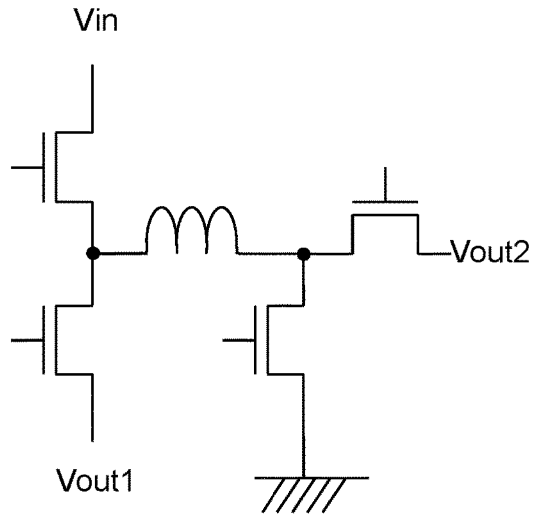
Fig. 8I
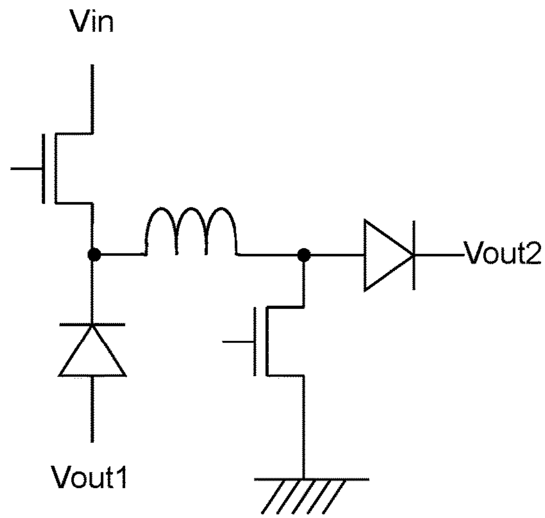
Fig. 8J

SWITCHING CONVERTER AND CONTROL CIRCUIT AND DISCONTINUOUS CONDUCTION MODE CONTROL METHOD THEREOF

CROSS REFERENCE

The present invention claims priority to TW application Ser. No. 112118193, filed on May 16, 2023, which application is incorporated herein by its reference in its entirety.

BACKGROUND OF THE INVENTION

Field of Invention

The present invention relates to a switching converter; particularly, it relates to such switching converter which can be precisely controlled when the switching converter operates at a discontinuous conduction mode (DCM). The present invention also relates to a control circuit and a control method configured to control such switching converter.

Description of Related Art

Please refer to FIG. 1A, FIG. 1B and FIG. 1C. FIG. 1A shows a schematic diagram of a conventional switching converter (i.e., a switching converter 900). FIG. 1B illustrates signal waveform diagrams depicting signals associated with a situation where the switching converter 900 operates in a light load status. FIG. 1C illustrates signal waveform diagrams depicting signals associated with a situation where the switching converter 900 operates in a heavy load status which is switched from a light load status. The switching converter 900 of FIG. 1A comprises: a power stage circuit 90 and a control circuit 91. At least one switch of the power stage circuit 90 switches one terminal of an inductor L between an input voltage Vin and a ground potential according to a high side operation signal SH and a low side operation signal SL which are generated based upon a pulse width modulation (PWM) signal PWM, hence converting the input voltage Vin to an output voltage Vout. The control circuit 91 modulates a pulse width and generates the PWM signal PWM according to the output voltage Vout.

As shown in FIG. 1B, when the switching converter 900 remains operating in the light load status, at a time point t1 shown in FIG. 1B, a compensation voltage Vc exceeds a reference voltage Vref, and thus, the high side operation signal SH switches to a high level for turning ON a high side switch QH, thus rendering the output voltage Vout to increase. Besides, when the switching converter 900 remains operating in the light load status, within a period between the time point t1 and a time point t2, the filtered compensation voltage Vc correlated with filtering a voltage difference between the reference voltage Vref and the output voltage Vout ceases rising up and begins to fall. At the time point t2 shown in FIG. 1B, the high side operation signal SH is switched to a low level, whereas, the low side operation signal SL is switched to a high level, so that the high side switch QH is turned OFF, whereas, a low side switch QL is turned ON, thus rendering the output voltage Vout to be decreased. Subsequent to a time point t3 shown in FIG. 1B (i.e., subsequent to a situation where the high side switch QH and the low side switch QL in the power stage circuit 90 are both turned OFF), because a load is in the light load status, an inductor current IL flowing through the inductor L becomes a zero current, a level of the output voltage Vout keeps being decreased, whereas, a level of the compensation voltage Vc also keeps being decreased to a point where the level of the compensation voltage Vc is reduced to a saturation voltage Vstr, wherein the saturation voltage Vstr can be, for example, a ground potential.

Please still refer to FIG. 1B. At a time point t4 shown in FIG. 1B, because the level of the output voltage Vout exceeds lower than the reference voltage Vref, the level of the compensation voltage Vc is about to increase. However, because the compensation voltage Vc is a filtered voltage, the compensation voltage Vc will not increase immediately at the time point t4. Because the switching converter 900 remains operating in the light load status, the high side operation signal SH will be once again switched to a high level when the compensation voltage Vc increases and exceeds the reference voltage Vref, whereby a whole new cycle is repeated.

The prior art shown in FIG. 1A, FIG. 1B and FIG. 1C has at least one following drawback that: when the load is in the light load status, during a period between the time point t3 and the time point t4, because an absolute value of a falling slope of the level of the output voltage Vout is relatively smaller (i.e., a falling speed of the output voltage Vout is relatively slower), a length of the period between the time point t3 and the time point t4 is long enough for the compensation voltage Vc to decrease to a saturation voltage Vstr. In this case, when the load status changes from the light load status to a heavy load status (e.g., at a time point t6 shown in FIG. 1C), a load current Io changes from a low level to a high level. Consequently, in this case, an unwanted undershoot will appear in the output voltage Vout. As mentioned above, at the time point t6 shown in FIG. 1C, because the level of the compensation voltage Vc remains at a relatively lower level, and even to the level of the saturation voltage Vstr of the compensation voltage Vc, a rising time of the output voltage Vout is relatively longer. Because it takes a relatively longer time from the time point to where the load status is transitioned from the light load status to the heavy load status, to a time point t7 where the compensation voltage Vc exceeds the reference voltage Vref, the level of the output voltage Vout keeps decreasing, thereby unwantedly affecting a transient response capacity of the conventional switching converter 900. Additionally, the prior art shown in FIG. 1A, FIG. 1B and FIG. 1C has following drawbacks that: the conventional switching converter 900 is unwantedly energy-consuming and has an undesirable low efficiency.

It is worthwhile noting that, a distinction between the term "light load status" and the term "heavy load status" generally lies in that: as one of average skill in the art will further appreciate, the term "light load status", as may be used herein, refers to: a level of a load current Io is relatively lower, whereas, the term "heavy load status", as may be used herein, refers to: a level of a load current Io is relatively higher. Alternatively, by adopting another approach, a distinction between the term "light load status" and the term "heavy load status" lies in that: as one of average skill in the art will further appreciate, the term "light load status", as may be used herein, refers to: an inductor current IL remains as a zero current for a consecutive period when the conventional switching converter 900 operates at a discontinuous conduction mode (DCM), whereas, the term "heavy load status", as may be used herein, refers to: an interval where no zero current appears in the inductor current IL within a period when the conventional switching converter 900 operates at DCM.

SUMMARY OF THE INVENTION

From one perspective, the present invention provides a switching converter, comprising: a power stage circuit, which is configured to operably switch at least one switch of the power stage circuit according to a control signal, to convert an input voltage to an output voltage; and a control circuit, which is configured to operably execute modulation on a pulse width according to a feedback voltage related to the output voltage, to generate the control signal in a heavy load status; wherein in a case where a light load status is in the presence and in a case where the switching converter operates at a discontinuous conduction mode (DCM), after an inductor current flowing through the power stage circuit has already become a zero current, the control circuit is configured to operably cease executing modulation on the pulse width according to the feedback voltage and keep a compensation voltage correlated with the output voltage at a present level.

In one embodiment, the control circuit includes: a compensation voltage comparator, which is configured to operably compare the compensation voltage with a compensation threshold voltage, to generate a compensation comparison signal; a pulse width decision circuit, which is configured to operably generate the control signal in accordance with the compensation comparison signal in the heavy load status; a feedback voltage comparator, which is configured to operably compare a reference voltage and the feedback voltage, to generate a feedback comparison signal; and a light load detection circuit, wherein after the inductor current flowing through the power stage circuit has already become the zero current, the light load detection circuit is configured to operably decide an occurrence time point of a zero current operation and the light load detection circuit is configured to operably decide a termination time point of the zero current operation based upon the feedback comparison signal.

In one embodiment, the compensation threshold voltage is the reference voltage or a ramp voltage, wherein the ramp voltage is correlated with the control signal.

In one embodiment, in the heavy load status, the switching converter operates at a constant ON time (COT) mode.

In one embodiment, after the inductor current flowing through the power stage circuit has already become the zero current, the light load detection circuit is configured to operably decide the occurrence time point according to the feedback voltage or after the light load detection circuit has already conducted an operation of timing for a preset period, the light load detection circuit is configured to operably decide the occurrence time point.

In one embodiment, the light load detection circuit is configured to operably decide the occurrence time point based upon a situation wherein each of the at least one switch is OFF.

In one embodiment, the control circuit further includes: a timer circuit, which is configured to operably conduct an operation of timing for a duplication period from the occurrence time point to a time point where the compensation comparison signal is a zero voltage, and then immediately continue timing for the duplication period to determine the termination time point.

In one embodiment, the control circuit further includes: a compensator having: a feedback voltage amplifier, wherein in the heavy load status, the feedback voltage amplifier is configured to operably amplify a difference between the reference voltage and the feedback voltage, so as to generate a feedback amplification voltage; and a filter circuit, wherein in the heavy load status, the filter circuit is configured to operably execute an operation of filtering on the feedback amplification voltage to generate the compensation voltage, and wherein during the zero current operation, the filter circuit is configured to operably keep the compensation voltage correlated with the output voltage at the present level.

In one embodiment, the timer circuit includes: a digital timer or an analog timer.

In one embodiment, the digital timer begins to count up for the duplication period at the occurrence time point, and subsequently begins to count down for the duplication period right after the digital timer finishing counting up for the duplication period to determine the termination time point.

In one embodiment, subsequent to the termination time point, the control circuit adjusts the control signal, so as to turn ON the corresponding at least one switch for an additional ON time.

From another perspective, the present invention provides a control circuit, which is configured to operably control a switching converter, wherein the switching converter includes: a power stage circuit, which is configured to operably switch at least one switch of the power stage circuit according to a control signal, to convert an input voltage to an output voltage; wherein the control circuit is configured to operably execute modulation on a pulse width according to a feedback voltage related to the output voltage, to generate the control signal in a heavy load status; wherein in a case where a light load status is in the presence and in a case where the switching converter operates at a discontinuous conduction mode (DCM), after an inductor current flowing through the power stage circuit has already become a zero current, the control circuit is configured to operably cease executing modulation on the pulse width according to the feedback voltage and keep a compensation voltage correlated with the output voltage at a present level; the control circuit comprising: a compensation voltage comparator, which is configured to operably compare the compensation voltage with a compensation threshold voltage, to generate a compensation comparison signal; a pulse width decision circuit, which is configured to operably generate the control signal in accordance with the compensation comparison signal in the heavy load status; a feedback voltage comparator, which is configured to operably compare a reference voltage and the feedback voltage, to generate a feedback comparison signal; and a light load detection circuit, wherein after the inductor current flowing through the power stage circuit has already become the zero current, the light load detection circuit is configured to operably decide an occurrence time point of a zero current operation and the light load detection circuit is configured to operably decide a termination time point of the zero current operation based upon the feedback comparison signal.

From yet another perspective, the present invention provides a control method for a switching converter operating at a discontinuous conduction mode (DCM), which is configured to operably control the switching converter, wherein the switching converter includes: a power stage circuit, which is configured to operably switch at least one switch of the power stage circuit according to a control signal, to convert an input voltage to an output voltage; the control method comprising following steps:

in a heavy load status, executing modulation on a pulse width according to a feedback voltage related to the output voltage, to generate the control signal; and in a case where a light load status is in the presence and in a case where the switching converter operates at the discontinuous conduction mode (DCM), after an inductor current flowing through the power stage circuit has already become a zero current, ceasing executing modulation on the pulse width according to the feedback voltage and keeping a compensation voltage correlated with the output voltage at a present level.

From still another perspective, the present invention provides a switching converter, comprising: a power stage circuit, which is configured to operably switch at least one switch of the power stage circuit according to a control signal, to convert an input voltage to an output voltage; and a control circuit, which is configured to operably execute modulation on a pulse width according to a feedback voltage related to the output voltage, to generate the control signal in a heavy load status; wherein in a case where a light load status is in the presence and in a case where the switching converter operates at a discontinuous conduction mode (DCM), after an inductor current flowing through the power stage circuit has already become a zero current, the control circuit is configured to operably decide an occurrence time point of a zero current operation and the control circuit is configured to operably decide a termination time point of the zero current operation based upon the feedback comparison signal; wherein during the zero current operation, the control circuit is configured to operably cease executing modulation on the pulse width according to the feedback voltage, and, at the occurrence time point, the control circuit begins to conduct an operation of timing for a duplication period to a time point where the feedback voltage exceeds a reference voltage, and thereafter once again conducting the operation of timing for the duplication period, and then ceasing conducting the operation of timing, and after conducting the operation of timing has already been ceased, restoring to execute modulation on the pulse width according to the feedback voltage or adjusting the control signal, so as to turn ON the corresponding at least one switch for an additional ON time.

From still another perspective, the present invention provides a control method for a switching converter operating at a discontinuous conduction mode (DCM), comprising following steps: in a heavy load status, executing modulation on a pulse width according to a feedback voltage related to the output voltage, to generate the control signal; switching at least one switch according to a control signal, to convert an input voltage to an output voltage; in a case where a light load status is in the presence and in a case where the discontinuous conduction mode (DCM) is in the presence, deciding an occurrence time point of a zero current operation according to a situation where an inductor current has already become a zero current and deciding a termination time point of the zero current operation based upon the feedback comparison signal; during the zero current operation, ceasing executing modulation on the pulse width according to the feedback voltage, and, at the occurrence time point, beginning to conduct an operation of timing for a duplication period to a time point where the feedback voltage exceeds a reference voltage, and thereafter once again conducting the operation of timing for the duplication period, and then ceasing conducting the operation of timing; and after conducting the operation of timing has already been ceased, restoring to execute modulation on the pulse width according to the feedback voltage or adjusting the control signal, so as to turn ON the corresponding at least one switch for an additional ON time.

The present invention provides a switching converter that is capable of being precisely controlled in a discontinuous conduction mode (DCM). The switching converter of the present invention is advantageous in that: in a light load status, the present invention can cease executing modulation on the pulse width and keep a level of a compensation voltage, so that the level of the compensation voltage will not keep decreasing, thereby remarkably improving transient response capacity of the conventional switching converter 900 and enhancing efficiency. Besides, the switching converter of the present invention can enhance accuracy of the output voltage, so that an intermediate value of a falling level of the output voltage is equal to the reference voltage, wherein such intermediate value will not be affected due to a situation where executing modulation on the pulse width is ceased.

The objectives, technical details, features, and effects of the present invention will be better understood with regard to the detailed description of the embodiments below, with reference to the attached drawings.

BRIEF DESCRIPTION OF THE DRAWINGS

FIG. 8A to FIG. 8L show schematic diagrams of a power stage circuit in a switching converter according to several embodiments of the present invention.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
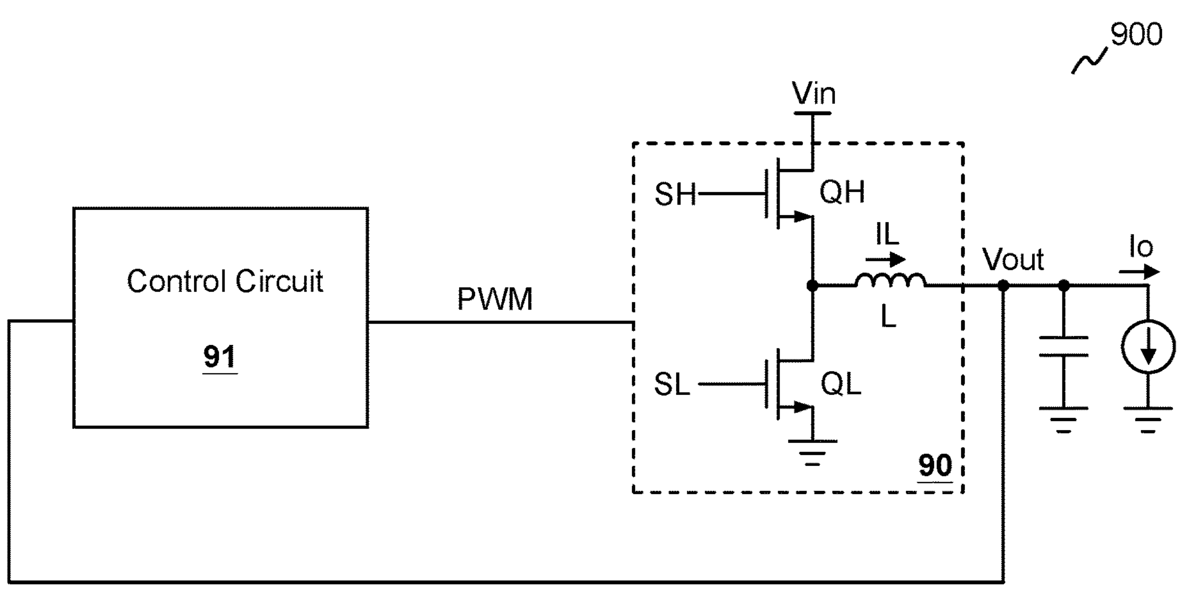
FIG. 1A shows a schematic diagram of a conventional switching converter.
Figure 1B:
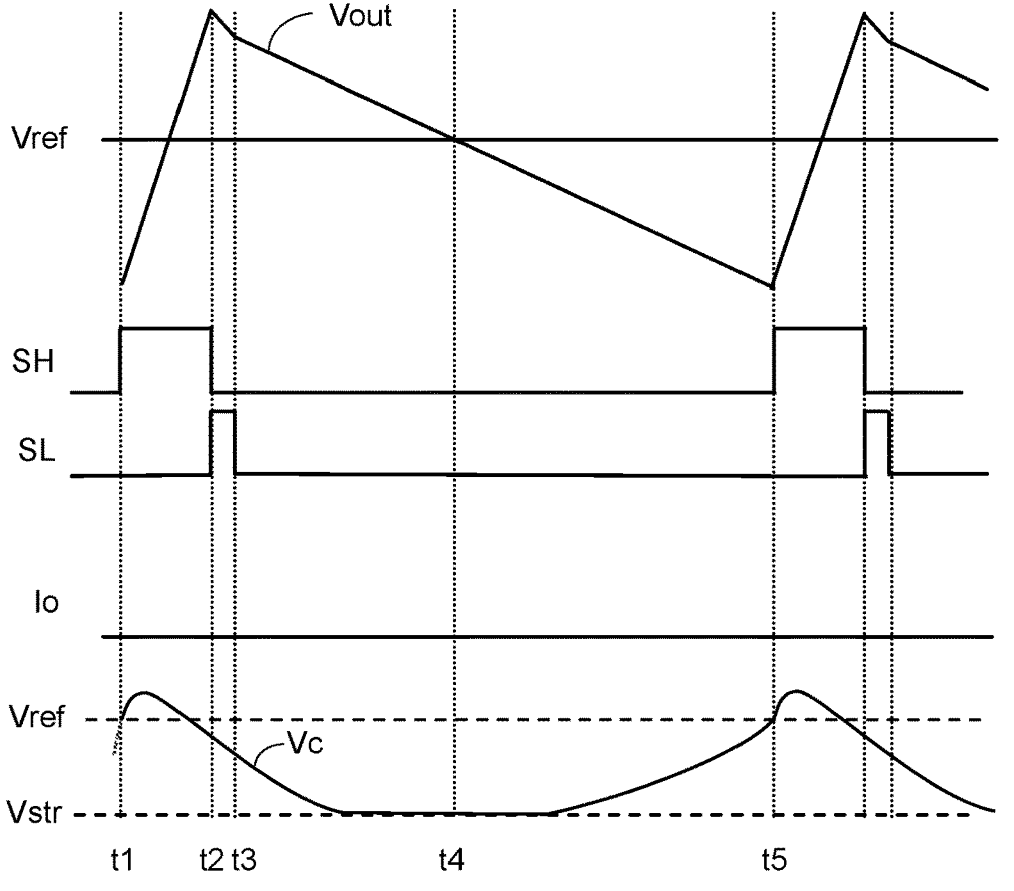
FIG. 1B illustrates signal waveform diagrams depicting signals associated with a situation where a conventional switching converter operates in a light load status.
Figure 1C:
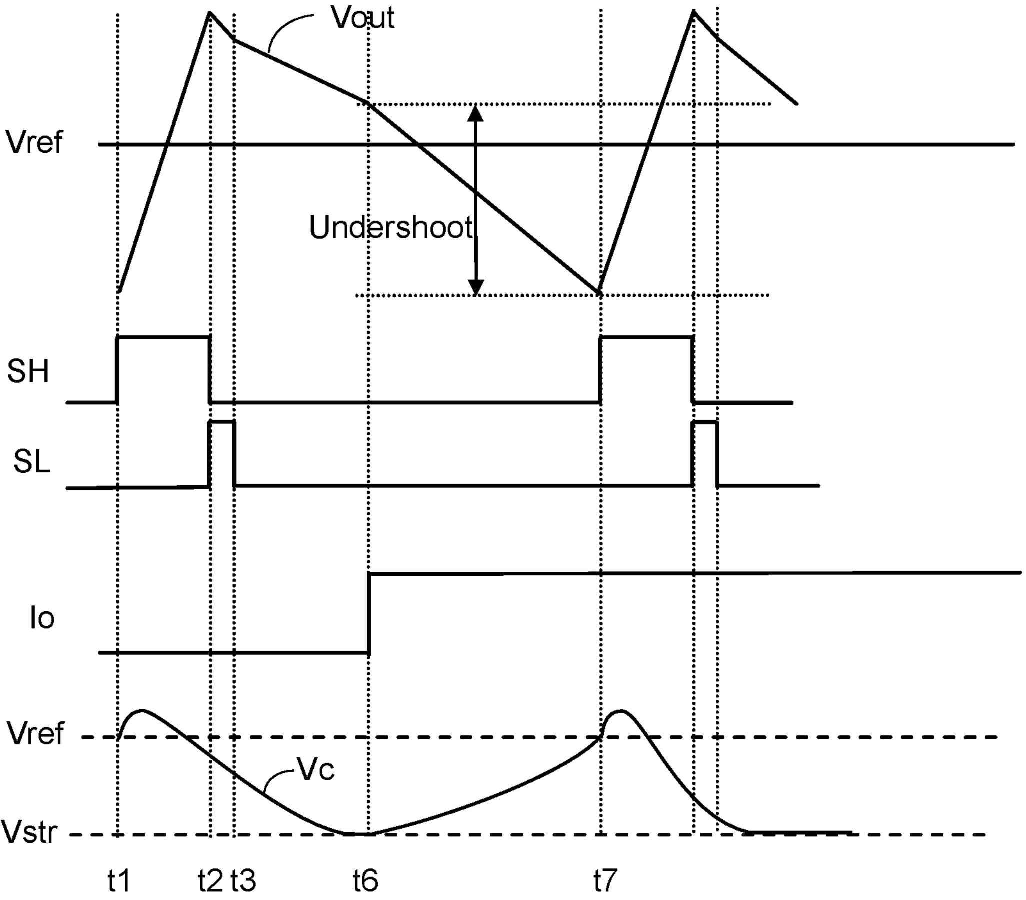
FIG. 1C illustrates signal waveform diagrams depicting signals associated with a situation where a conventional switching converter operates in a heavy load status which is switched from a light load status.
Figure 2A:
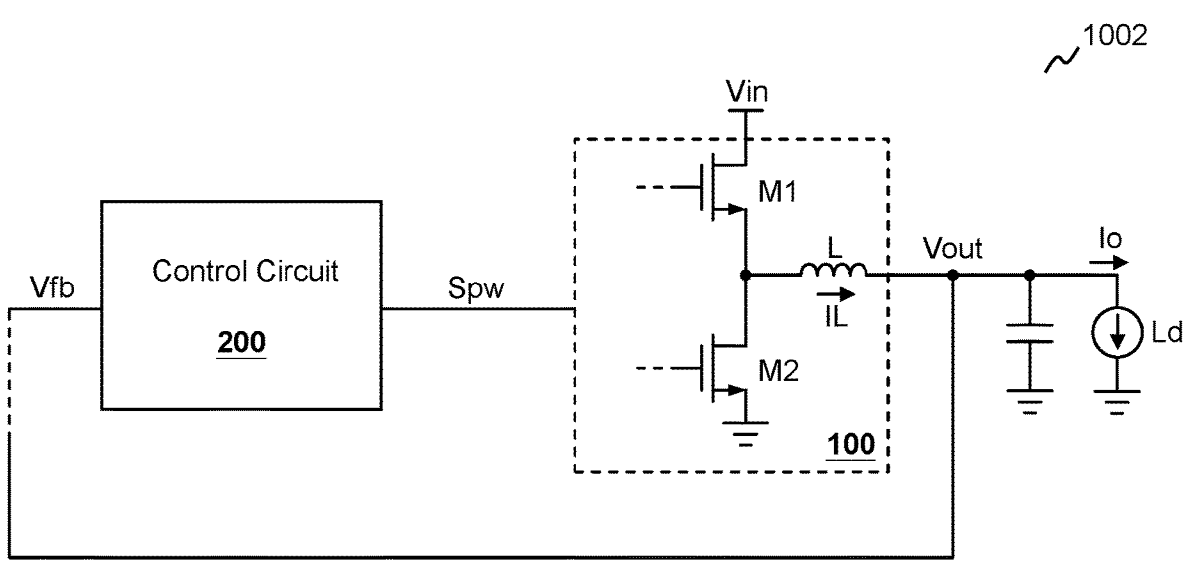
FIG. 2A shows a schematic block diagram of a switching converter according to an embodiment of the present invention.

Please refer to FIG. 2A, which shows a schematic block diagram of a switching converter according to an embodiment of the present invention. As shown in FIG. 2A, in one embodiment, the switching converter 1002 comprises: a power stage circuit 100 and a control circuit 200. In one embodiment, the power stage circuit 100 of the present invention includes: at least one switch and an inductor L, wherein the power stage circuit 100 is configured to operably switch the at least one switch of the power stage circuit 100 according to a control signal Spw, to convert an input voltage Vin to an output voltage Vout, and the power stage circuit 100 can be implemented as several embodiments, as shown in FIG. 8A to FIG. 8L. In the power stage circuit 100 of the present invention, the at least one switch switches the inductor L according to the control signal Spw, to convert the input voltage Vin to the output voltage Vout. As shown in FIG. 8A to FIG. 8L, the power stage circuit 100 of the present invention includes, for example but not limited to, a boost converter, a buck converter, a buck-boost converter, a flyback converter or a switched resonant converter. In this embodiment, the at least one switch includes: a switch M1 and a switch M2, wherein each of the switch M1 and the switch M2 is an N-type metal 1 oxide semiconductor (MOS) device. In one embodiment, the power stage circuit 100 is configured to operably switch the switch M1 and the switch M2 of the power stage circuit 100 according to the control signal Spw, to convert the input voltage Vin to the output voltage Vout.

Figure 2B:
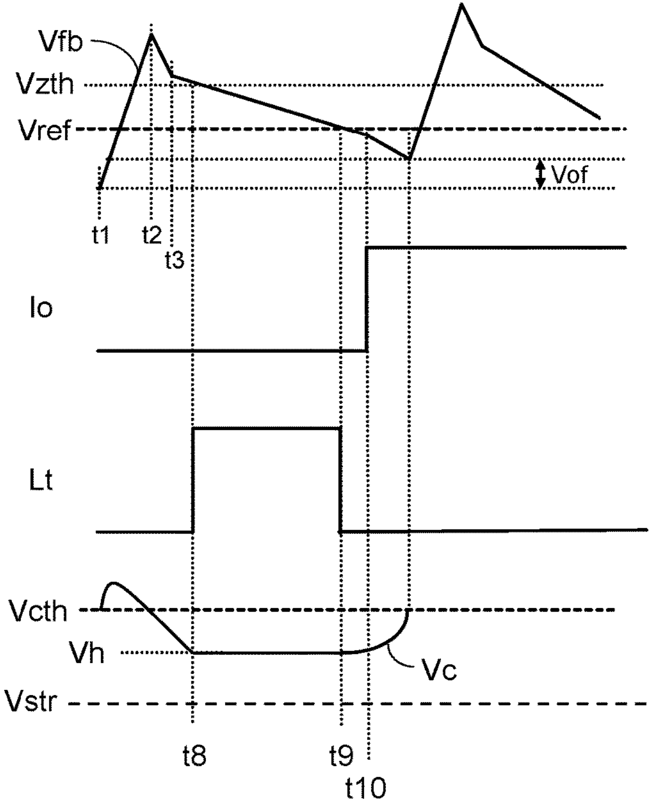
FIG. 2B illustrates signal waveform diagrams depicting signals associated with a situation where a switching converter operates in a discontinuous conduction mode (DCM) according to an embodiment of the present invention.

Please refer to FIG. 2A along with FIG. 2B. FIG. 2B illustrates signal waveform diagrams depicting signals associated with a situation where a switching converter operates in a discontinuous conduction mode (DCM) according to an embodiment of the present invention. In one embodiment, in a heavy load status, the control circuit 200 is configured to operably execute modulation on a pulse width according to a feedback voltage Vfb related to the output voltage Vout, to generate the control signal Spw, thereby controlling the switch M1 and the switch M2 to switch the inductor L. In one embodiment, the feedback voltage Vfb is equal to the output voltage Vout. In one specific embodiment, during an interval ranging from a time point t1 to a time point t2 in FIG. 2B, the control signal Spw serves to control the switch M1 to be ON and control the switch M2 to be OFF. During an interval ranging from a time point t2 to a time point t3 in FIG. 2B, the control signal Spw serves to control the switch M2 to be ON and control the switch M1 to be OFF. Subsequent to the time point t3, the switch M1 and the switch M2 are both OFF, so that an inductor current IL flowing through the power stage circuit 100 remains at a zero current. In one embodiment, in a case where the switching converter 1002 operates at a discontinuous conduction mode (DCM), after an inductor current IL flowing through the power stage circuit 100 (i.e., the inductor current IL flowing through the inductor L) has already become the zero current, the control circuit 200 is configured to operably cease executing modulation on the pulse width according to the feedback voltage Vfb at a time point t8 and keep a compensation voltage Vc at a present level Vh until for example a situation where feedback voltage Vfb exceeds a reference voltage Vref (e.g., at a time point t9).

It is worthwhile noting that, as one of average skill in the art will further appreciate, the term "present level Vh", as may be used herein, refers to: in one embodiment, the term "present level Vh" can be a level of the compensation voltage Vc in a case where the control circuit 200 is configured to operably cease executing modulation on the pulse width according to the feedback voltage Vfb. In another embodiment, the term "present level Vh" can be a constant level which lies between a ground potential and the aforesaid saturation voltage Vstr. The main purpose for keeping the compensation voltage Vc at the present level Vh lies in that: when a light load status is transitioned to a heavy load status, the level of the compensation voltage Vc can be relative to the saturation voltage Vstr, so that the level of the compensation voltage Vc can become more approximate to a compensation threshold voltage Vcth (in one embodiment, a compensation threshold voltage Vcth can be a reference voltage Vref), thus spurring a rising speed of the output voltage Vout and to thereby accomplishing following efficacies: (1) improving transient response capacity of the switching converter 1002; (2) reducing power consumption; and (3) enhancing conversion efficiency.

Note that although it is preferred and intended for the present invention to precisely keep the compensation voltage Vc at the present level Vh, however due to non-idealities of circuitry caused by for example imperfection of components or imperfect matching among components, the compensation voltage Vc may not be equal to exactly the present level Vh, but just substantially close to the present level Vh. In other words, according to the present invention, a certain level of error between the compensation voltage Vc and the present level Vh is acceptable, which remains within the broadest scope of the present invention.

As shown by the embodiment of FIG. 2B, after the inductor current IL flowing through the power stage circuit 100 has already become the zero current, subsequent to a situation where the control circuit 200, for example but not limited to, has already conducted an operation of timing for a preset period, the control circuit 200 is configured to operably decide to cease executing modulation on the pulse width according to the feedback voltage Vfb at a time point t8 and keep the compensation voltage Vc at the present level Vh at the time point t8, wherein the present level Vh is a constant level. In another embodiment, after the inductor current IL flowing through the power stage circuit 100 has already become the zero current, according to a situation where, for example but not limited to, a feedback voltage Vfb exceeds a threshold voltage Vzth (e.g., at the time point t8), the control circuit 200 is configured to operably decide to cease executing modulation on the pulse width according to the feedback voltage Vfb at the time point t8 and begin keeping the compensation voltage Vc at the present level Vh at the time point t8. In yet another embodiment, after a circumstance where the switch M1 and the switch M2 are both OFF, subsequent to a situation where the control circuit 200, for example but not limited to, has already conducted an operation of timing for the preset period, the control circuit 200 is configured to operably decide to cease executing modulation on the pulse width according to the feedback voltage Vfb at the time point t8 and keep the compensation voltage Vc at the present level Vh at the time point t8. Consequently, in this case, without requiring the control circuit 200 to retrieve a sensing signal corresponding to the inductor current IL, the control circuit 200 can straightforwardly affirm a time point where the inductor current IL flowing through the power stage circuit 100 has already become the zero current. In other words, in this case, the control circuit 200 can straightforwardly affirm a time point where the inductor current IL flowing through the power stage circuit 100 has already become the zero current simply via the control signal Spw (which serves to control the switch M1 and the switch M2).

Figure 3:
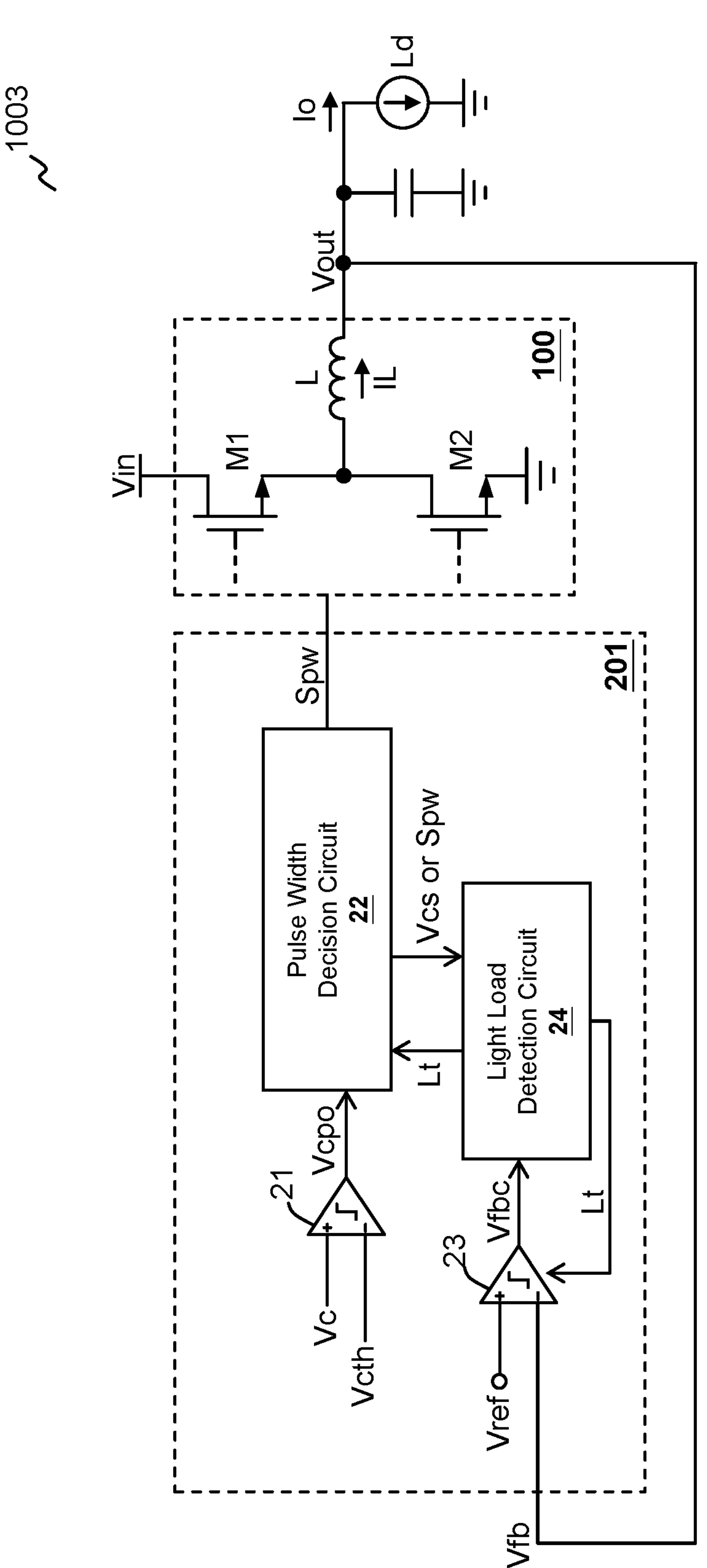
FIG. 3 shows a schematic diagram of a switching converter according to an embodiment of the present invention.

Please refer to FIG. 3, which shows a schematic diagram of a switching converter (i.e., switching converter 1003) according to an embodiment of the present invention. In one embodiment, a control circuit 201 shown in FIG. 3 includes: a compensation voltage comparator 21, a pulse width decision circuit 22, a feedback voltage comparator 23 and a light load detection circuit 24. In one embodiment, the compensation voltage comparator 21 is configured to operably compare a compensation voltage Vc with a compensation threshold voltage Vcth, to generate a compensation comparison signal Vcpo. The pulse width decision circuit 22 is configured to operably generate the control signal Spw in accordance with the compensation comparison signal Vcpo in a heavy load status. In one embodiment, the feedback voltage comparator 23 is configured to operably compare a reference voltage Vref and a feedback voltage Vfb, to generate a feedback comparison signal Vfbc. In one embodiment, the light load detection circuit 24 is configured to operably produce a zero current indication signal Lt (i.e., the zero current indication signal Lt is switched to a high level, as shown in FIG. 2B) based upon a signal (e.g., a current sensing signal Vcs or the control signal Spw) related to a situation where the inductor current IL is a zero current or based upon a situation where the control signal Spw indicates that a switch M1 and a switch M2 are both OFF. As a result, in this case, based upon above-mentioned premise and mechanism, after the inductor current IL flowing through the power stage circuit 100 has already become the zero current, the light load detection circuit 24 is configured to operably decide an occurrence time point of a zero current operation and the light load detection circuit 24 is configured to operably decide a termination time point of the zero current operation (i.e., the zero current indication signal Lt is switched to a low level, as shown in FIG. 2B) based upon the feedback comparison signal Vfbc.

Please refer to FIG. 3 along with FIG. 2B. In one embodiment, as shown in FIG. 3, at the occurrence time point (i.e., time point t8) of the zero current operation, the control circuit 201 is configured to operably start keeping the compensation voltage Vc at the present level Vh. Besides, at the termination time point (i.e., time point t9) of the zero current operation, the control circuit 201 is configured to operably, for example but not limited to, restore to execute modulation on the pulse width according to the feedback voltage Vfb, so as to render the compensation voltage Vc to begin to be raised up. In another embodiment, at the termination time point (i.e., time point t9) of the zero current operation, the control circuit 201 is configured to operably, for example but not limited to, adjust the control signal Spw, so as to turn ON the corresponding switch (e.g., the switch M1) for an additional ON time, thus rendering the compensation voltage Vc to begin to be raised up. In one embodiment, in a heavy load status, the switching converter 1003 according to the present invention operates at a constant ON time (COT) mode. As a consequence, in this case, through adopting an operation mechanism in the COT mode when the switching converter 1003 is in a heavy load status, at the termination time point (i.e., time point t9) of the zero current operation, the switching converter 1003 according to the present invention is capable of turning ON the corresponding switch (e.g., the switch M1) for an additional ON time.

Figure 4:
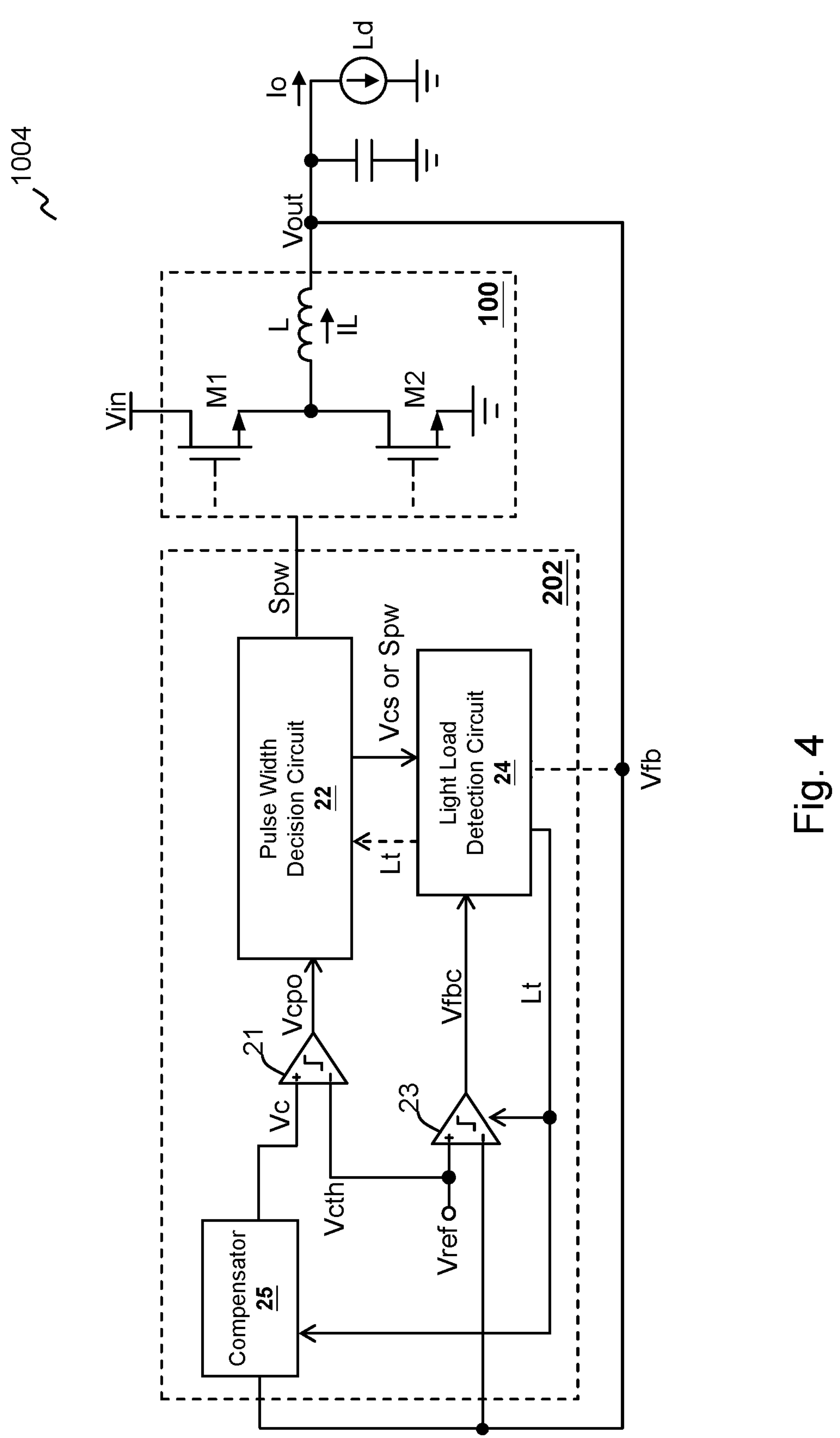
FIG. 4 shows a schematic diagram of a switching converter according to an embodiment of the present invention.

Please refer to FIG. 4, which shows a schematic diagram of a switching converter (i.e., switching converter 1004) according invention. The switching to an embodiment of the present invention. The switching converter 1004 of this embodiment shown in FIG. 4 is similar to the switching converter 1003 of the embodiment shown in FIG. 3, but is different in that: as compared to the switching converter 1003 of the embodiment shown in FIG. 3, in one embodiment, the switching converter 1004 of this embodiment shown in FIG. 4 further includes: a compensator 25. In one embodiment, the compensator 25 is configured to operably generate a compensation voltage Vc according to a feedback voltage Vfb and keep the compensation voltage Vc at a present level Vh during a zero current operation. In one embodiment, a compensation threshold voltage Vcth is a reference voltage Vref (as shown in FIG. 4) or a ramp voltage, wherein the ramp voltage is correlated with the control signal Spw.

Please refer to FIG. 4 along with FIG. 2B. Subsequent to a situation where the inductor current IL is a zero current, the light load detection circuit 24 is configured to operably decide an occurrence time point (i.e., the time point t8) of a zero current operation in accordance with following circumstances: (1) the feedback voltage Vfb; (2) after the light load detection circuit 24 has already conducted an operation of timing for a preset period; or (3) a situation where each of at least one switch (i.e., both a switch M1 and a switch M2) of the power stage circuit 100 is OFF, so as to indicate the occurrence time point (i.e., the time point t8) and a termination time point (i.e., the time point t9) of the zero current operation via a zero current indication signal Lt, so that a compensator 25 keeps a compensation voltage Vc at a present level Vh during the zero current operation, wherein the present level Vh can be for example a level that the compensation voltage Vc has at the occurrence time point (i.e., the time point t8). In one embodiment, the light load detection circuit 24 is configured to operably decide the termination time point (i.e., the time point t9) based upon a situation where a feedback comparison signal Vibc indicates that the feedback voltage Vfb is lower than the reference voltage Vref.

It is worthwhile noting that, as shown in FIG. 2B, the switching converter of the present invention operates at a DCM. Moreover, subsequent to a situation where the inductor current IL flowing through the power stage circuit 100 has already become the zero current, at the time point t8, the switching converter of the present invention serves keep the compensation voltage Vc at the present level Vh. Consequently, in this case, when the load is in an extremely light load status, even though following circumstances are in the presence: (1) a falling speed of a level of the feedback voltage Vfb is relatively slower; (2) a length of an interval ranging between the time point t8 and the time point t9 is relatively longer; and (3) the compensation voltage Vc begins to be raised up at the time point t9, because the level of the compensation voltage Vc can remain being kept at the present level Vh during the interval ranging between the time point t8 and the time point t9, the level of the compensation voltage Vc will not be reduced to a relatively lower level, the level of the compensation voltage Vc will not be reduced even to a point where the level of the compensation voltage Vc reaches the saturation voltage Vstr. As a consequence, in this case, when the load is transitioned from a light load status to a heavy load status (e.g., at a time point t10 shown in FIG. 2B, a load current Io will be transitioned from a lower level to a higher level), the compensation voltage Vc can be swiftly raised up from the present level Vh, thus preventing an unwanted undershoot (which is unwantedly produced in the prior art) from appearing in the output voltage Vout. In light of the above, as compared to the prior art, the switching converter of the present invention is advantageous in that: the present invention has an improved transient response capacity; the present invention is more power-effective; and the present invention has enhanced efficiency.

Moreover, it is worthwhile noting that, although the aforementioned embodiments can remarkably improve transient response capacity of the switching converter, because during a zero current operation, the control circuit is configured to operably cease executing modulation on the pulse width according to the feedback voltage Vfb, an average level of the feedback voltage Vfb during this period (i.e., during the period where the zero current operation is conducted) will not be equal to the reference voltage Vref, indicating that an offset lies between the average level of the feedback voltage Vfb during this period and the reference voltage Vref. As shown in FIG. 2B, the feedback voltage Vfb has an offset voltage Vof, so the aforementioned embodiment is incapable of controlling the average level of the feedback voltage Vfb during this period to become at the reference voltage Vref. To improve the above-mentioned drawbacks, a coping mechanism as to how to improve the above-mentioned drawbacks will be fully elaborated later in the following embodiment shown in FIG. 5.

Figure 5:
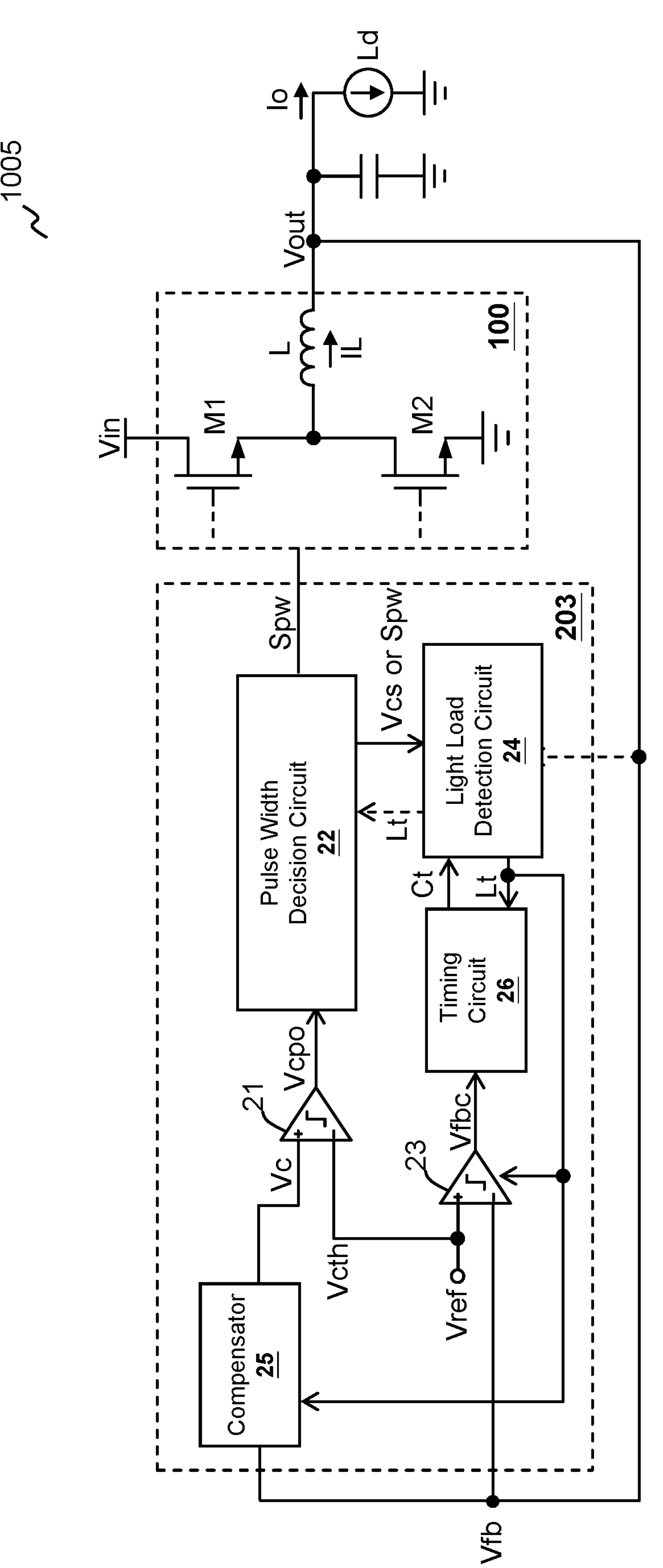
FIG. 5 shows a schematic diagram of a switching converter according to an embodiment of the present invention.

Please refer to FIG. 5, which shows a schematic diagram of a switching converter (i.e., switching converter 1005) according to an embodiment of the present invention. The switching converter 1005 of this embodiment shown in FIG. 5 is similar to the switching converter 1004 of the embodiment shown in FIG. 4, but is different in that: as compared to the switching converter 1004 of the embodiment shown in FIG. 4, in one embodiment, a control circuit 203 in the switching converter 1005 of this embodiment shown in FIG. 5 further includes: a timer circuit 26.

Figure 6A:
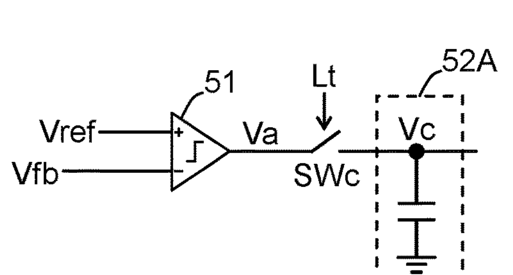
FIG. 6A to FIG. 6C show schematic diagrams of a compensator in a switching converter according to several embodiments of the present invention.
Figure 6B:
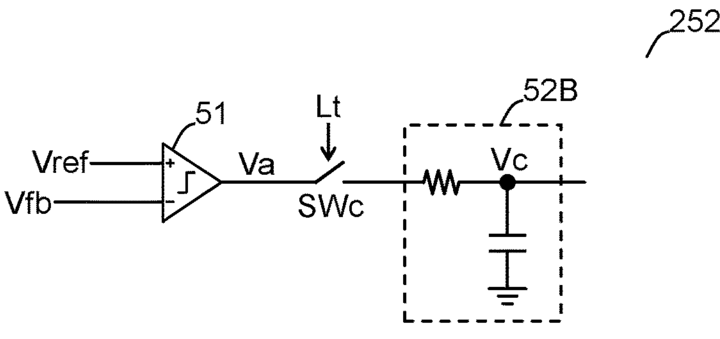
Figure 6C:
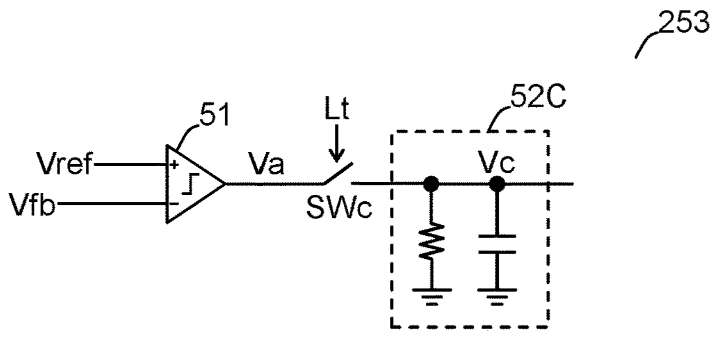

Please refer to FIG. 5 along with FIG. 6A to FIG. 6C. FIG. 6A to FIG. 6C show schematic diagrams of a compensator in a switching converter according to several embodiments of the present invention. The compensator 25 shown in FIG. 5 can be implemented as a compensator 251 shown in FIG. 6A, a compensator 252 shown in FIG. 6B or a compensator 253 shown in FIG. 6C. In one embodiment, as shown in FIG. 6A, the compensator 251 includes: a feedback voltage amplifier 51, a switch SWc and a filter circuit 52A. In one embodiment, the filter circuit 52A shown in FIG. 6A includes: a capacitor. In other embodiments, the filter circuit can be implemented as including: at least one resistor and a capacitor, as shown by a filter circuit 52B in FIG. 6B and as shown by a filter circuit 52C in FIG. 6C. In one embodiment, the switch SWc is switched according to a zero current indication signal Lt. The compensator 251 shown in FIG. 6A is taken herein as an example. Further, a case where an operation mechanism of the compensator 251 shown in FIG. 6A will be fully described in following descriptions. In regard to an operation mechanism of the compensator 252 shown in FIG. 6B and an operation mechanism of the compensator 253 shown in FIG. 6C, those skilled in the art can readily conceive based upon the following descriptions, so the details thereof will not be redundantly explained hereinafter.

Figure 7:
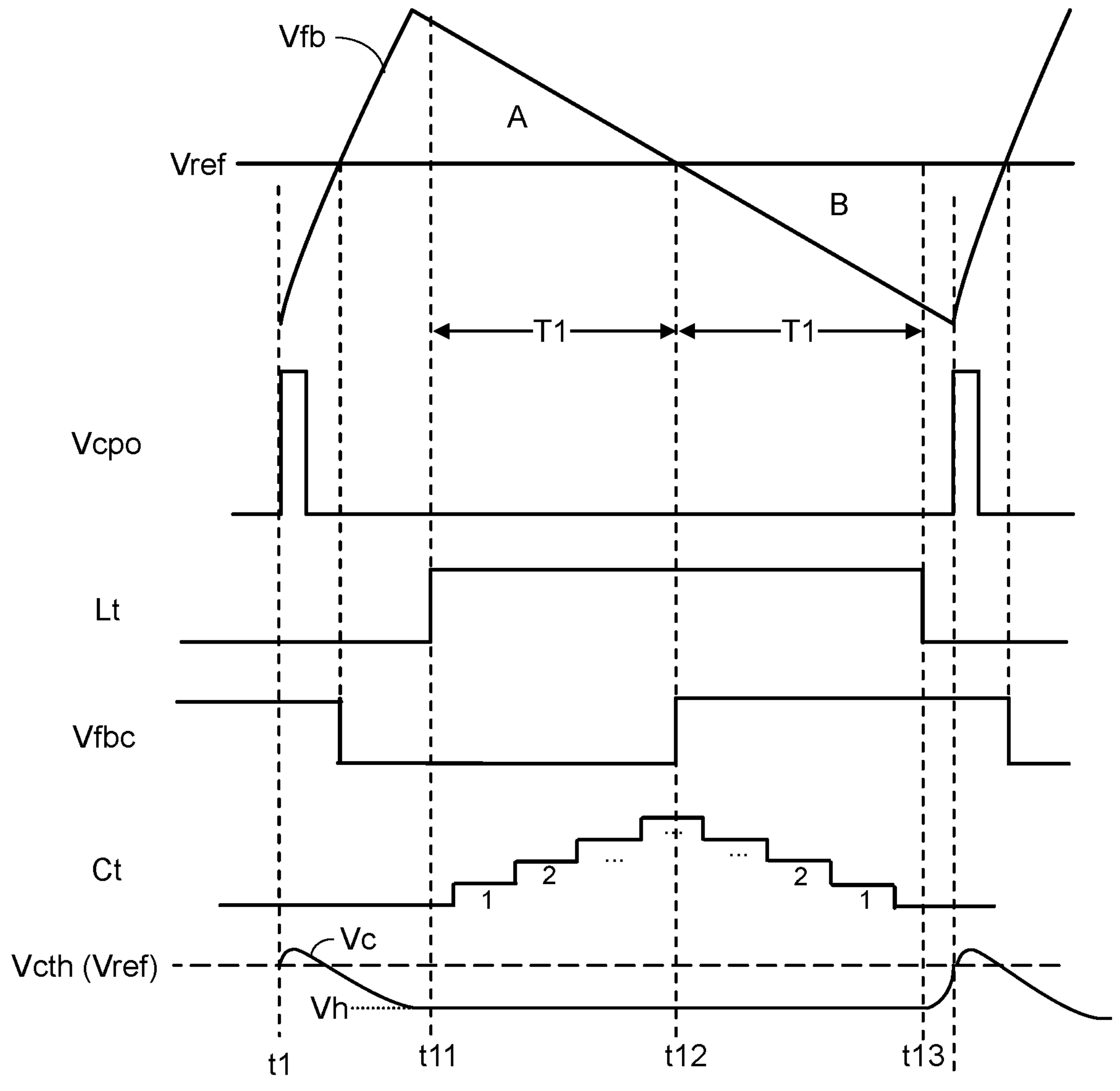
FIG. 7 illustrates signal waveform diagrams depicting signals associated with a situation where a switching converter operates in a light load status according to an embodiment of the present invention.
Figure 8K:
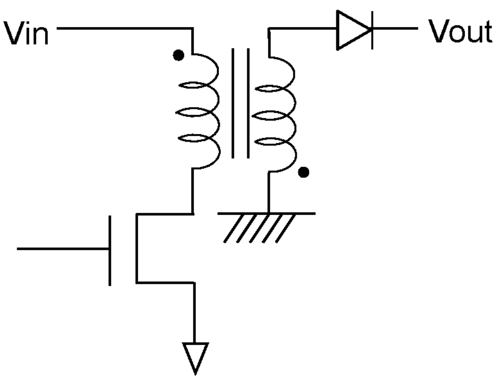
Figure 8L:
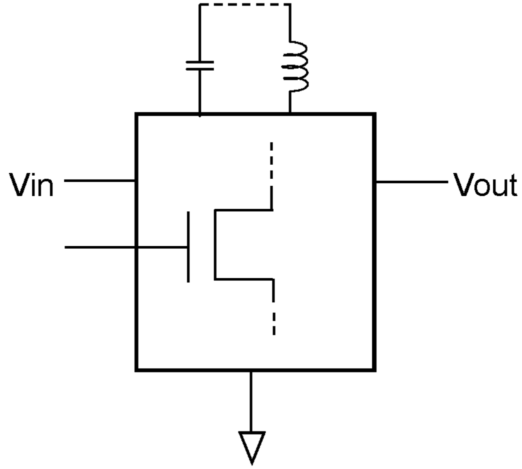

Please refer to FIG. 6A along with FIG. 7. FIG. 7 illustrates signal waveform diagrams depicting signals associated with a situation where a switching converter operates in a light load status according to an embodiment of the present invention. In one embodiment, when a switching converter operates in a heavy load status (not shown), the feedback voltage amplifier 51 is configured to operably amplify a difference between a reference voltage Vref and a feedback voltage Vfb, so as to generate a feedback amplification voltage Va. As a result, in this case, the switch SWc is ON, the filter circuit 52A shown in FIG. 6A serves to execute an operation of filtering on the feedback amplification voltage Va, to produce a compensation voltage Vc. Please refer to FIG. 3. In a heavy load status (not shown), the compensation voltage comparator 21 is configured to operably compare a compensation voltage Vc with a compensation threshold voltage Vcth, to generate a compensation comparison signal Vcpo. In a case where the compensation voltage Vc exceeds the compensation threshold voltage Vcth, a pulse of the compensation comparison signal Vcpo is generated. As exemplified by an operation mechanism in a COT mode, the pulse width decision circuit 22 is configured to operably adjust the control signal Spw in accordance with the compensation comparison signal Vcpo in a heavy load status, so that during a period where the compensation comparison Vcpo generates the pulse, the pulse width decision circuit 22 is configured to operably switch the control signal Spw to a high level for an additional ON time, thus turning ON the switch M1 within the additional ON time and to thereby render the output voltage Vout to be raised up.

In one embodiment, when a switching converter operates in a light load status, at a time point t1 shown in FIG. 7, because the compensation voltage Vc exceeds the compensation threshold voltage Vcth, a pulse of the compensation comparison signal Vcpo is generated. By conducting an operation mechanism in a COT mode, the control signal Spw is switched to the high level for the additional ON time and to thereby render the output voltage Vout and the feedback voltage Vfb to be raised up. Subsequent to the additional ON time, the present invention turns ON the switch M1 and turns OFF the switch M2. As a result, in this case, the output voltage Vout and the feedback voltage Vfb keep being raised up due to a situation where an inductor current IL uninterruptedly flows to a load Ld. Subsequently, at a time point where the inductor current IL has already become a zero current, the switch M2 is OFF, so that the output voltage Vout and the feedback voltage Vfb begin to be reduced. According to the present invention, the zero current indication signal Lt serves to indicate the occurrence time point (i.e., time point t11 in FIG. 7) of the zero current operation. At the time point t11 in FIG. 7, a switch SWc is switched to be non-conductive (i.e., OFF), so as to keep the compensation voltage Vc at the present level Vh (i.e., a level of the compensation voltage Vc at the time point t11 in FIG. 7).

Please refer to FIG. 5 along with FIG. 7. In one embodiment, when the zero current indication signal Lt serves to indicate the occurrence time point (i.e., the time point t11 in FIG. 7) of the zero current operation, the timer circuit 26 is configured to operably conduct an operation of timing for a duplication period T1 from the occurrence time point (i.e., the time point t11 in FIG. 7) to a time point where the feedback comparison signal Vfbc is a zero voltage (i.e., the feedback voltage Vfb equal to the reference voltage Vref at the time point t12 in FIG. 7), and then immediately continue timing for the duplication period T1 to determine the termination time point (i.e., a time point t13 in FIG. 7).

In one embodiment, the timer circuit 26 includes: a digital timer or an analog timer. For example, in an implementation where the timer circuit 26 is a digital timer (as shown by a waveform diagram indicative of a timing signal Ct in FIG. 7), after the timer circuit 26 has begun to count up for the duplication period T1 at the occurrence time point (i.e., the time point t11 in FIG. 7) according to the zero current indication signal Lt and subsequently count down for the duplication period T1 at the occurrence time point according to the feedback comparison signal Vfbc, the timer circuit 26 is configured to operably decide the termination time point (i.e., the time point t13 in FIG. 7), so that the light load detection circuit 24 is switched to a low level based upon the timing signal Ct, thus indicating the zero current operation is terminated by the compensator 25.

It is worthwhile noting that, in the aforementioned embodiment, because the at least one switch (i.e., the switch M1 and the switch M2) of the power stage circuit 100 is OFF during the zero current operation, when a load Ld is in a light load status and when a level of a load current Io remains substantially unchanged (e.g., the load current Io remains substantially a zero current), after the timer circuit 26 has already conducted an operation of timing for the duplication period T1 and subsequently conducts an operation of timing for the duplication period T1, the timer circuit 26 is configured to operably decide a termination time point of an operation in a light load status, so that an area A of a first waveform diagram is equal to an area B of the first waveform diagram. That is, an intermediate level of the feedback voltage Vfb is equal to the reference voltage Vref. As a consequence, in this case, during a zero current operation, even though a control circuit is configured to operably cease executing modulation on the pulse width according to the feedback voltage Vfb, a level of the feedback voltage Vfb remains accurate.

It is worthwhile noting that, in other embodiments, it can be designed that a compensation voltage Vc is not kept at a present level Vh. Consequently, in this case, the present invention can execute an operation of calibration on a feedback voltage Vfb via the aforementioned mechanism conducted by the aforementioned timer circuit of the present invention.

Please refer to FIG. 8A to FIG. 8L, which show schematic diagrams of a power stage circuit in a switching converter according to several embodiments of the present invention. The power stage circuit of the present invention includes: at least one switch and an inductor which are coupled to each other, wherein the at least one switch serves to switch the inductor according to a control signal, to convert an input power to an output power. As shown in FIG. 8A to FIG. 8L, the power stage circuit of the present invention includes, for example but not limited to, a boost converter, a buck converter, a buck-boost converter, a flyback converter or a switched resonant converter.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switching converter, comprising:

a power stage circuit, which is configured to operably switch at least one switch of the power stage circuit according to a control signal, to convert an input voltage to an output voltage; and a control circuit, which is configured to operably execute modulation on a pulse width according to a feedback voltage related to the output voltage, to generate the control signal in a heavy load status;

wherein in a case where a light load status is in the presence and in a case where the switching converter operates in a discontinuous conduction mode (DCM), after an inductor current flowing through the power stage circuit has already become a zero current, the control circuit is configured to operably cease executing modulation on the pulse width according to the feedback voltage and keep a compensation voltage correlated with the output voltage at a present level;

wherein the control circuit includes:

a compensation voltage comparator, which is configured to operably compare the compensation voltage with a compensation threshold voltage, to generate a compensation comparison signal;

a pulse width decision circuit, which is configured to operably generate the control signal in accordance with the compensation comparison signal in the heavy load status;

a feedback voltage comparator, which is configured to operably compare a reference voltage and the feedback voltage, to generate a feedback comparison signal; and a light load detection circuit, wherein after the inductor current flowing through the power stage circuit has already become the zero current, the light load detection circuit is configured to operably decide an occurrence time point of a zero current operation and the light load detection circuit is configured to operably decide a termination time point of the zero current operation based upon the feedback comparison signal.

2. The switching converter as claimed in claim 1, wherein the compensation threshold voltage is the reference voltage or a ramp voltage, wherein the ramp voltage is correlated with the control signal.

3. The switching converter as claimed in claim 2, wherein the control circuit further includes:

a compensator having:

a feedback voltage amplifier, wherein in the heavy load status, the feedback voltage amplifier is configured to operably amplify a difference between the reference voltage and the feedback voltage, so as to generate a feedback amplification voltage; and a filter circuit, wherein in the heavy load status, the filter circuit is configured to operably execute an operation of filtering on the feedback amplification voltage to generate the compensation voltage, and wherein during the zero current operation, the filter circuit is configured to operably keep the compensation voltage correlated with the output voltage at the present level.

4. The switching converter as claimed in claim 1, wherein in the heavy load status, the switching converter operates in a constant ON time (COT) mode.

5. The switching converter as claimed in claim 1, wherein after the inductor current flowing through the power stage circuit has already become the zero current, the light load detection circuit is configured to operably decide the occurrence time point according to the feedback voltage or after the light load detection circuit has already conducted an operation of timing for a preset period, the light load detection circuit is configured to operably decide the occurrence time point.

6. The switching converter as claimed in claim 1, wherein the light load detection circuit is configured to operably decide the occurrence time point based upon a situation wherein each of the at least one switch is OFF.

7. The switching converter as claimed in claim 1, wherein the control circuit further includes:

a timer circuit, which is configured to operably conduct an operation of timing for a duplication period from the occurrence time point to a time point where the compensation comparison signal is a zero voltage, and then immediately continue timing for the duplication period to determine the termination time point.

8. The switching converter as claimed in claim 7, wherein the timer circuit includes: a digital timer or an analog timer.

9. The switching converter as claimed in claim 8, wherein the digital timer begins to count up for the duplication period at the occurrence time point, and subsequently begins to count down for the duplication period right after the digital timer finishing counting up for the duplication period to determine the termination time point.

10. The switching converter as claimed in claim 1, wherein subsequent to the termination time point, the control circuit adjusts the control signal, so as to turn ON a corresponding switch of the at least one switch for an additional ON time.

11. A control circuit, which is configured to operably control a switching converter, wherein the switching converter includes: a power stage circuit, which is configured to operably switch at least one switch of the power stage circuit according to a control signal, to convert an input voltage to an output voltage;

wherein the control circuit is configured to operably execute modulation on a pulse width according to a feedback voltage related to the output voltage, to generate the control signal in a heavy load status;

wherein in a case where a light load status is in the presence and in a case where the switching converter operates in a discontinuous conduction mode (DCM), after an inductor current flowing through the power stage circuit has already become a zero current, the control circuit is configured to operably cease executing modulation on the pulse width according to the feedback voltage and keep a compensation voltage correlated with the output voltage at a present level;

the control circuit comprising:

a compensation voltage comparator, which is configured to operably compare the compensation voltage with a compensation threshold voltage, to generate a compensation comparison signal;

a pulse width decision circuit, which is configured to operably generate the control signal in accordance with the compensation comparison signal in the heavy load status;

a feedback voltage comparator, which is configured to operably compare a reference voltage and the feedback voltage, to generate a feedback comparison signal; and a light load detection circuit, wherein after the inductor current flowing through the power stage circuit has already become the zero current, the light load detection circuit is configured to operably decide an occurrence time point of a zero current operation and the light load detection circuit is configured to operably decide a termination time point of the zero current operation based upon the feedback comparison signal.

12. The control circuit as claimed in claim 11, wherein the compensation threshold voltage is the reference voltage or a ramp voltage, wherein the ramp voltage is correlated with the control signal.

13. The control circuit as claimed in claim 12, further comprising:

a compensator having:

a feedback voltage amplifier, wherein in the heavy load status, the feedback voltage amplifier is configured to operably amplify a difference between the reference voltage and the feedback voltage, so as to generate a feedback amplification voltage; and a filter circuit, wherein in the heavy load status, the filter circuit is configured to operably execute an operation of filtering on the feedback amplification voltage to generate the compensation voltage, and wherein during the zero current operation, the filter circuit is configured to operably keep the compensation voltage correlated with the output voltage at the present level.

14. The control circuit as claimed in claim 11, wherein the heavy load status, the switching converter operates in a constant ON time (COT) mode.

15. The control circuit as claimed in claim 11, wherein after the inductor current flowing through the power stage circuit has already become the zero current, the light load detection circuit is configured to operably decide the occurrence time point according to the feedback voltage or after the light load detection circuit has already conducted an operation of timing for a preset period, the light load detection circuit is configured to operably decide the occurrence time point.

16. The control circuit as claimed in claim 11, wherein the light load detection circuit is configured to operably decide the occurrence time point based upon a situation wherein each of the at least one switch is OFF.

17. The control circuit as claimed in claim 11, further comprising:

a timer circuit, which is configured to operably conduct an operation of timing for a duplication period from the occurrence time point to a time point where the compensation comparison signal is a zero voltage, and then immediately continue timing for the duplication period to determine the termination time point.

18. The control circuit as claimed in claim 17, wherein the timer circuit includes: a digital timer or an analog timer.

19. The control circuit as claimed in claim 18, wherein the digital timer begins to count up for the duplication period at the occurrence time point, and subsequently begins to count down for the duplication period right after the digital timer finishing counting up for the duplication period to determine the termination time point.

20. The control circuit as claimed in claim 11, wherein subsequent to the termination time point, the control circuit adjusts the control signal, so as to turn ON a corresponding switch of the at least one switch for an additional ON time.

21. A control method for a switching converter operating in a discontinuous conduction mode (DCM), which is configured to operably control the switching converter, wherein the switching converter includes: a power stage circuit, which is configured to operably switch at least one switch of the power stage circuit according to a control signal, to convert an input voltage to an output voltage; the control method comprising following steps:

in a heavy load status, executing modulation on a pulse width according to a feedback voltage related to the output voltage, to generate the control signal;

in a case where a light load status is in the presence and in a case where the switching converter operates in the discontinuous conduction mode (DCM), after an inductor current flowing through the power stage circuit has already become a zero current, ceasing executing modulation on the pulse width according to the feedback voltage and keeping a compensation voltage correlated with the output voltage at a present level;

comparing the compensation voltage with a compensation threshold voltage, to generate a compensation comparison signal;

in the heavy load status, generating the control signal in accordance with the compensation comparison signal;

comparing a reference voltage and the feedback voltage, to generate a feedback comparison signal; and after the inductor current flowing through the power stage circuit has already become the zero current, deciding an occurrence time point of a zero current operation and deciding a termination time point of the zero current operation based upon the feedback comparison signal.

22. The control method as claimed in claim 21, wherein the compensation threshold voltage is the reference voltage or a ramp voltage, wherein the ramp voltage is correlated with the control signal.

23. The control method as claimed in claim 22, further comprising following steps:

in the heavy load status, amplifying a difference between the reference voltage and the feedback voltage, so as to generate a feedback amplification voltage; and in the heavy load status, filtering on the feedback amplification voltage to generate the compensation voltage, and wherein during the zero current operation, keeping the compensation voltage correlated with the output voltage at the present level.

24. The control method as claimed in claim 21, wherein in the heavy load status, the switching converter operates in a constant ON time (COT) mode.

25. The control method as claimed in claim 21, further comprising following steps:

after the inductor current flowing through the power stage circuit has already become the zero current, deciding the occurrence time point according to the feedback voltage or after timing for a preset period right after the inductor current becoming the zero current, deciding the occurrence time point.

26. The control method as claimed in claim 21, further comprising following steps:

deciding the occurrence time point based upon a situation wherein each of the at least one switch is OFF.

27. The control method as claimed in claim 21, further comprising following steps:

conducting an operation of timing for a duplication period from the occurrence time point to a time point where the compensation comparison signal is a zero voltage, and then immediately continuing timing for the duplication period to determine the termination time point.

28. The control method as claimed in claim 27, further comprising:

beginning to count up for the duplication period at the occurrence time point, and subsequently beginning to count down for the duplication period right after finishing counting up for the duplication period by a digital timer to determine the termination time point.

29. The control method as claimed in claim 21, further comprising following steps:

subsequent to the termination time point, adjusting the control signal, so as to turn ON a corresponding switch of the at least one switch for an additional ON time.

* * * * *